United States Patent [19]  
Hall

[11] Patent Number: 4,987,854  
[45] Date of Patent: Jan. 29, 1991

[54] APPARATUS FOR GAS-AIDED DISPENSING OF LIQUID MATERIALS

[75] Inventor: Robert C. Hall, Strongville, Ohio

[73] Assignee: Nordson Corporation, Westlake, Ohio

[21] Appl. No.: 283,259

[22] Filed: Dec. 12, 1988

[51] Int. Cl.⁵ .............................................. B05C 13/00
[52] U.S. Cl. .................................... 118/679; 118/688; 118/300; 118/323; 239/296
[58] Field of Search .................. 118/62, 63, 665, 668, 118/669, 679, 676, 680, 682, 683, 706, 300, 313, 314, 315, 323, 687, 688; 239/296

[56] References Cited

U.S. PATENT DOCUMENTS

| 721,900 | 3/1903 | Lassoe et al. | 239/406 |
|---|---|---|---|
| 2,626,424 | 1/1953 | Howthorne, Jr. | 65/5 |
| 3,053,461 | 9/1962 | Inglis | 239/411 |
| 3,152,923 | 10/1964 | Marshall et al. | 118/324 |
| 3,294,058 | 12/1966 | Shriro | 118/323 |
| 3,434,865 | 3/1969 | Doquire et al. | 118/300 |
| 3,635,400 | 1/1975 | Nord et al. | 239/15 |
| 3,747,852 | 7/1973 | Nord et al. | 239/8 |
| 3,764,069 | 10/1973 | Runstadtler, Jr. | 239/8 |
| 3,825,379 | 7/1974 | Lohkamp et al. | 425/72 |
| 3,841,567 | 10/1974 | Drozek et al. | 239/570 |
| 4,185,981 | 1/1980 | Ohsato et al. | 65/5 |
| 4,219,157 | 8/1980 | Binoche | 239/296 |
| 4,228,958 | 10/1989 | Perry | 239/411 |
| 4,241,880 | 12/1980 | Hastings | 239/691 |
| 4,273,293 | 6/1981 | Hastings | 239/705 |
| 4,381,081 | 4/1983 | Hastings | 239/707 |
| 4,411,389 | 10/1983 | Harrison | 239/427.5 |
| 4,502,629 | 3/1985 | McGhee et al. | 239/3 |
| 4,515,836 | 5/1985 | Cobbs, Jr. et al. | 427/425 |
| 4,544,100 | 10/1985 | Simashkevich et al. | 239/407 |
| 4,553,701 | 11/1985 | Rehman et al. | 239/432 |
| 4,573,429 | 3/1986 | Cobbs, Jr. et al. | 118/322 |
| 4,709,858 | 12/1987 | Stern et al. | 118/300 |
| 4,714,635 | 12/1987 | Mochizuki et al. | 427/421 |
| 4,785,996 | 11/1988 | Ziecker et al. | 239/298 |
| 4,842,162 | 6/1989 | Merkel | 227/55 |
| 4,891,249 | 1/1990 | McIntyre | 427/421 |
| 4,894,252 | 1/1990 | Bongen et al. | 118/314 |

FOREIGN PATENT DOCUMENTS

| 213535 | 8/1986 | European Pat. Off. | |
|---|---|---|---|
| 3238201 | 6/1984 | Fed. Rep. of Germany . | |
| 3613348 | 10/1987 | Fed. Rep. of Germany . | |
| 204216 | 11/1983 | German Democratic Rep. . | |
| 1109198 | 8/1984 | U.S.S.R. | 239/290 |
| 1240465 | 6/1986 | U.S.S.R. | 239/290 |
| 2054412 | 2/1981 | United Kingdom . | |

OTHER PUBLICATIONS

Technical Publication of Nordson Corporation, Amherst, Ohio, 1981 (Publication 43-1-11).

Primary Examiner—Willard E. Hoag  
Attorney, Agent, or Firm—Wood, Herron & Evans

[57] ABSTRACT

An apparatus for depositing liquid material onto a workpiece in the form of a deposit having a desired conformation wherein the material is discharged under pressure from the nozzle of a dispensing gun which can be manipulated by a robot to lay the deposit according to a programmed pattern on the workpiece. One or more gas jets is directed toward the material after the material is discharged from the nozzle to impart a desired conformation to the material deposited on the workpiece. The flow rate of the gas jets is controlled in accordance with the liquid flow rate to maintain substantial uniformity of the conformation of the deposit. The flow rate of the gas jets may also be controlled with reference to a toolspeed signal which varies according to the relative speed between the nozzle and the workpiece as well as an auxiliary signal the latter of which can be used to selectively alter the conformation of the deposit.

26 Claims, 4 Drawing Sheets

APPARATUS FOR GAS-AIDED DISPENSING OF LIQUID MATERIALS

FIELD OF THE INVENTION

The present invention relates to systems for dispensing fluid material onto a workpiece. More particularly, the invention relates to fluid dispensing systems of the type wherein both a liquid and a gas are discharged from a dispensing gun to form a deposit of liquid material having a desired conformation on the surface of the workpiece.

BACKGROUND OF THE DISCLOSURE

In many fluid dispensing applications, it is desirable to control the flow of a fluid precisely and to have the ability to change flow control parameters rapidly. Such control may be desired either to maintain a given flow rate in the face of perturbations such as changes in the fluid's flow characteristics or supply pressure or, to effect similarly rapid changes in the flow rate such as may be required to account for changes in the relative speed between the dispenser and a workpiece onto which the fluid is being dispensed.

When dispensing viscous fluids such as certain lubricants, adhesives, sealants and the like, it is often necessary to apply the material to the surface of a workpiece in a bead or other form of deposit containing a desired amount of material per unit length. In high production processes or where the deposit of material must be positioned with accuracy, robot arms are often used to apply the material by rapidly guiding a dispensing nozzle in a programmed pattern over the surface of the workpiece. Depending on the application, the fluid being dispensed may either be projected some distance from the nozzle in a high velocity stream or extruded from the nozzle at lower velocity with the nozzle located closer to the workpiece. In either case, the amount of material applied per unit of lineal distance along the deposit will tend to vary according to both the flow rate of material discharged from the dispensing nozzle and the speed of the nozzle with respect to the workpiece.

In the automotive industry, such a process is used to apply a bead of sealant around the periphery of the inside surface of automobile doors before joining the inside panel to the door. Along long, straight portions of the pattern, a robot arm can move the nozzle quickly. However, where the desired bead pattern changes direction abruptly, such as around the corners of a door panel, the robot arm must be slowed down to achieve a required bead positioning accuracy. It can be appreciated that if the flow rate of the dispensed fluid material is held fixed, the amount of material in the applied bead will increase as the robot arm is decelerated to negotiate changes in direction and will decrease as the robot arm is accelerated. Likewise, changes in the fluid supply pressure or changes in the viscosity of the fluid material will tend to disrupt control over the size of the bead.

An apparatus and method which effectively addresses these difficulties is fully described in co-pending, commonly assigned U.S. patent application Ser. No. 06/924,940 now abandoned which is expressly incorporated herein by reference. That application discloses, inter alia, a fluid dispensing method and apparatus wherein a servo actuator drives a substantially infinitely variable fluid metering valve located in close proximity to a fluid discharge nozzle. The metering valve may suitably comprise a needle valve having a valve seat and a stem moveable relative the seat to vary the flow through the seat. A pressure sensor at the nozzle generates a signal correlated to the instantaneous flow rate of the dispensed fluid. Control over liquid flow rate is achieved by connecting the dispenser in a closed-loop system in which the servo actuator is driven by a control current derived in accordance with the difference between the flow rate signal and a driving signal representing a desired flow rate. In robotic applications, the driving signal is preferably related to a toolspeed signal generated by the controller of the robot carrying the dispenser so that the control current will vary as required to maintain a uniform bead of fluid material even during relatively rapid changes in the relative speed between the dispenser and the workpiece onto which material is dispensed.

Co-pending commonly assigned U.S. patent application Ser. No. 07/164,536 now U.S. Pat. No. 4,842,162 which is also expressly incorporated herein by reference in its entirety discloses a fluid dispensing method and apparatus wherein control of the actuator which drives the metering valve of a dispenser is improved by using a feedback signal which varies according to both the relative position and the relative velocity of the stem of the metering valve with respect to the seat of the metering valve. In a preferred embodiment, such a position-dependent velocity signal is generated by a transducer including both a magnet and a coil. The magnet and coil are juxtaposed to be moved relative one another in a manner tracking the relative movement between the stem and seat of the metering valve so that the magnitude of the position-dependent velocity signal increases as the relative velocity of the valve stem with respect to its seat increases. Also, for any given velocity, the influence of the magnet on the coil is such that the magnitude of the signal increases as the distance between the stem and seat decreases. By using such a position-dependent velocity signal as a feedback signal in the control loop operating the metering valve, rapid yet highly stable response can be achieved.

While the foregoing inventions provide dispensing apparati and methods which can be used to effect quite accurate control over the amount of fluid material per unit length contained in a deposit of material formed on a workpiece, it is sometimes also desirable to have the ability to exercise control over the conformation of the deposit. As used herein and in the claims, the term "conformation" refers to the shape of the bead in terms of its cross-sectional profile and the formation of its surface. For example, in some cases it may be desired to form a bead of material having a smooth surface and a high, well rounded profile while at other times a wider, flatter bead having a rippled surface may be desired. Moreover, it may be necessary or desirable to provide beads having differing conformations on different areas of the same workpiece with such beads being either mutually spaced or contiguous with one another. In the case of a spray or spatter type pattern not in the form of a continuous bead, "conformation" refers to such characteristics as the width of the pattern, the spacing, size and/or shape characteristics of the liquid as deposited on the workpiece.

Of course, the geometry of the outlet of the dispensing nozzle has an effect on the conformation of the deposited liquid as does the pressure under which the fluid is discharged from the nozzle outlet. However, it is not practical to attempt to vary the fluid pressure at the nozzle to effect significant changes in conformation of the deposited liquid material since such pressure variations would frustrate the crucial objective of accurately controlling the rate at which the material is dispensed. Substitution of nozzles is also not an attractive alternative since either a changeover delay or a more complex multi-nozzle dispensing apparatus would be required. The additional bulk and mass of such apparatus would limit its maneuverability and increase the weight supporting demand on manipulating robots. Moreover, changes in nozzle geometry alone may not be sufficient to provide a bead or other form of deposit of liquid material which contains a desired amount of material per unit length and also exhibits a particular desired and substantially uniform conformation.

Accordingly, there is a need for a simple and efficient apparatus and method for dispensing liquid material onto a workpiece in a deposit having a conformation substantially different from that which would normally be produced by a given nozzle at a given pressure and which is capable of maintaining a given conformation despite variations in the liquid flow rate and/or changes in the relative speed between the dispenser and the workpiece. There further exists a need for such an apparatus and method capable of selectively varying said conformation quickly and predictably. There is also a need for such an apparatus and method which avoids such undesired disruptions of said conformation as might otherwise be induced due to momentary irregularities in liquid supply pressure such as those which may be associated with the intake phase of the pumping cycle of a pump supplying liquid material to a dispenser.

SUMMARY OF THE INVENTION

The invention provides an improved apparatus and method for dispensing liquid material to form a deposit having a desired conformation on the surface of a workpiece. The liquid material is discharged under pressure from the nozzle of a dispensing gun which can be manipulated by a robot to lay the deposit along a programmed pattern. One or more gas jets are directed toward the liquid material after the material is discharged from the nozzle to impart a desired conformation to the deposit of liquid material. According to a first aspect of the invention, the flow rate of the gas jets is modulated by an electropneumatic transducer in accordance with at least one parameter such as the flow rate of liquid material discharged from the nozzle to maintain substantial uniformity of the conformation of the deposit despite perturbations in liquid flow rate. Where the liquid flow rate is itself controlled in accordance with changes in the relative speed between the workpiece and the dispensing gun to provide a deposit containing a controlled amount of liquid material per unit length along the pattern, a further aspect of the invention contemplates modulating the flow of the gas jets in accordance with a toolspeed signal correlated to the same relative speed. Yet a further aspect of the invention provides an apparatus and method for selectively varying the conformation of the deposit of liquid material over different portions of the pattern formed on a given workpiece and/or different workpieces by modulating the flow rate of the gas jets in accordance with an auxiliary signal which may conveniently comprise a programmed signal generated by the robot controller. This auxiliary signal may itself be combined with a liquid flow rate signal to maintain substantial uniformity of each conformation selected by the auxiliary signal despite perturbations in the liquid flow rate. Where the liquid flow rate is itself modulated in accordance with a toolspeed signal, the toolspeed signal may also be utilized according to the invention to derive a control signal for modulating the flow of the gas jets.

Notwithstanding the above-described systems for maintaining a substantially uniform conformation of a deposit of liquid material, it has been observed that undesired disruptions in the conformation of a deposit may still arise in some types of fluid dispensing systems. For example when dispensing a bead of material having a desired conformation such as a bead having a flattened profile with a rippled surface, undesired spattered areas may sometimes occur. Applicant has discovered that such disruptions can be caused by transient changes in liquid pressure due to the manner in which liquid is supplied to the dispensing gun. For instance, where a reciprocating piston pump is used to supply liquid material under pressure to the gun, a momentary pressure drop associated with the intake phase of the pumping cycle has been found to give rise to disruptions of the type illustrated in FIG. 6B. Accordingly, a further aspect of the invention relates to avoiding disruption of a desired conformation due to irregularities in manner liquid material is pumped to the dispensing gun. Where the liquid pumping cycle includes one or more intervals associated with a significant change in the pressure at which liquid is supplied to the dispenser such intervals are sensed and the flow of the gas jets modulated to compensate for the pressure change to avoid significant disruption of deposit conformation.

In one exemplary embodiment the liquid intake stroke of a reciprocating pump supplying the dispenser with liquid material is sensed mechanically and the flow rate of the gas jets reduced in timed relation to the arrival of the resulting liquid pressure drop at the nozzle of the gun. According to another embodiment, the pressure drop associated with the liquid intake phase of the pumping cycle is conveniently sensed by monitoring the electrical power consumption of the motor driving the pump.

These and other aspects and advantages of the invention will be apparent from the following detailed description of the invention and drawings wherein like numerals designate like items.

DETAILED DESCRIPTION OF THE INVENTION

Figure 1:
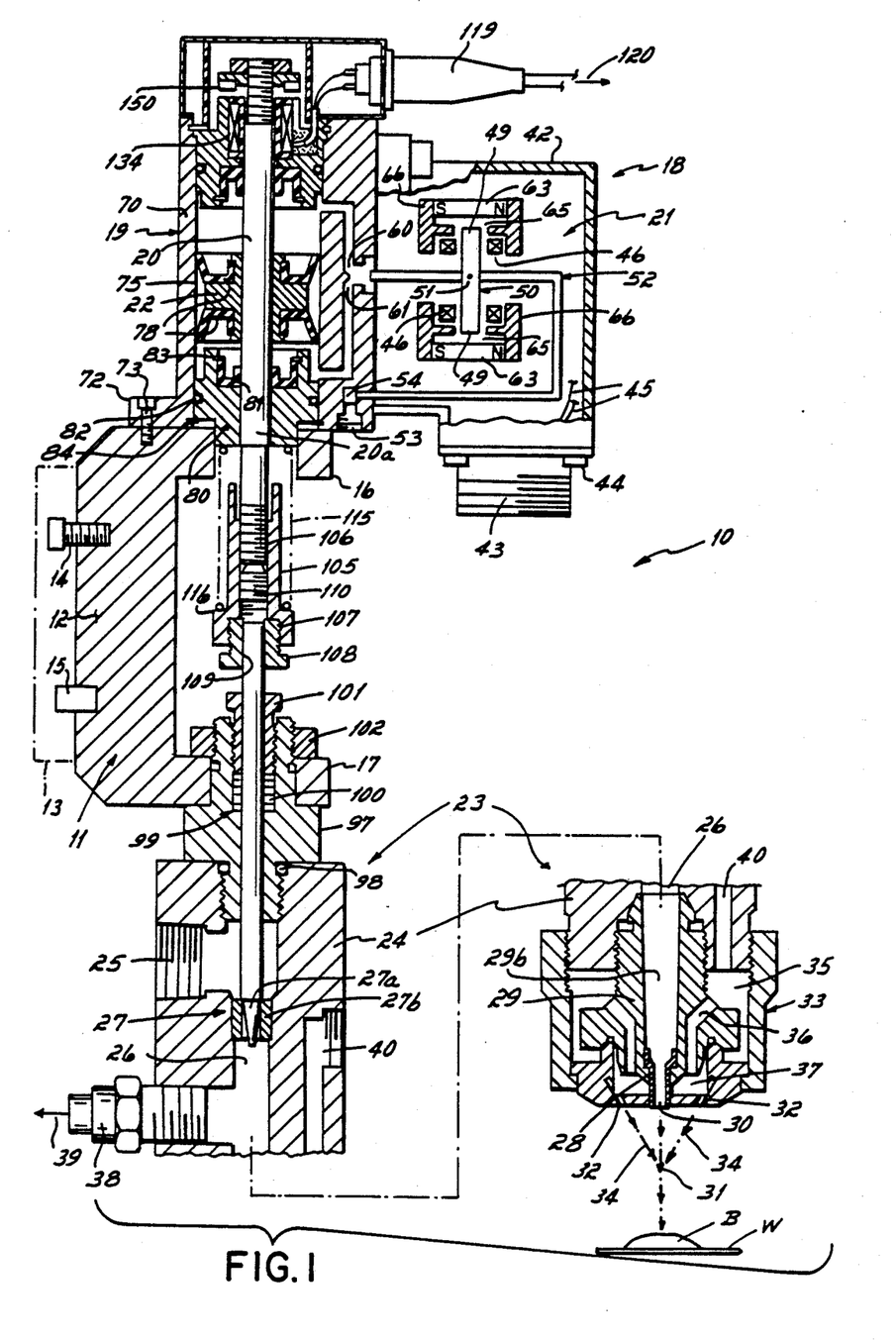
FIG. 1 is a schematic cross sectional view of a dispensing apparatus constructed according to the invention.

Referring now to FIG. 1, a preferred embodiment of a dispensing gun 10 constructed according to the invention is shown. Gun 10 includes a C-shaped frame 11 having a mounting plate 12 adapted to be secured to the tool mounting face 13 of a robot arm (not shown) by means of one or more cap screws 14 and alignment pins 15. Frame 11 is preferably constructed of a rigid, lightweight material such as aluminum alloy and further includes, extending outwardly from mounting plate 12, an upper portion 16, and an opposed lower portion 17. The upper portion 16 of frame 11 carries an electropneumatic servo actuator 18 which may consist of any of a number of types of compact, light weight linear actuators offering rapid response. Preferably, actuator 18 comprises a double-acting air cylinder 19 having a reciprocable piston rod 20 whose extension is controlled by an electrically actuated pneumatic servovalve 21 according to the pressure balance across a piston 22 affixed to piston rod 20. Servovalve 21 may be conveniently disposed to the side of air cylinder 19 (as shown). The lower portion 17 of frame 11 carries a metering valve assembly 23. Valve assembly 23 includes a valve body 24 which is of a rigid, non-resilient material preferably metal. Valve body 24 includes a radial fluid inlet 25 that is threaded so that a hose can be attached to connect gun 10 to a pressurized supply of the fluid material to be dispensed. Inlet 25 communicates with an axial liquid passage 26 in which is disposed a needle valve 27. The distal end of valve body 24 threadably receives a flow restricting nozzle 29 having an axial bore 29b contiguous with liquid passage 26. Nozzle 29 includes a replaceable nozzle insert 28 which is removably received within a pocket formed within bore 29b. Insert 28 is preferably of hardened metal or ceramic to reduce wear. Insert 28 defines a reduced diameter, circular liquid outlet 30 from which liquid to be dispensed is discharged in a stream 31 toward a workpiece, W to form a bead, B thereon.

Liquid outlet 30 is surrounded by a series of six passageways 32 formed within a gas cap 33 that is threadably secured to the outside of the distal end of valve body 24. Passageways 32 are each about 0.36 inches in diameter and are uniformly radially spaced outwardly of outlet 30 and are angled downwardly as shown so as to form six gas jets 34 focused on stream 31 at a common point about 0.671 inches from outlet 30. Passageways 32 are supplied with a gas, such as air, under pressure by way of a gas inlet 40 formed in valve body 24. Gas inlet 40 communicates with an annular chamber 35 enclosed by nozzle 29, valve body 24 and gas cap 33. Nozzle 29 is provided with a plurality of vents 36 connecting chamber 35 with an annular manifold 37 to which each passageway 32 is in turn connected.

For best control, needle valve 27 is located as close to nozzle 29 as is practical. Valve 27 includes a valve stem 27a having a generally conically tapered end and a matingly tapered valve seat 27b. For long life, both valve stem 27a and valve seat 27b are preferably fabricated of a hard material such as sintered tungsten carbide. Valve stem 32 is connected to piston rod 20 so that its conical end is axially movable both toward and away from valve seat 27b so that the flow rate of liquid discharged from the outlet 30 of nozzle 29, is controlled in accordance with the electrical input of electropneumatic servovalve 21.

A flow rate sensor 38 generates an electrical flow rate signal 39 correlated to the rate of flow of fluid discharged from the outlet 30 of nozzle 29. Preferably, flow rate sensor 38 comprises a pressure sensor threadably mounted in the wall of valve body 24 for sensing the pressure of the liquid being dispensed at a location just upstream of liquid outlet 30 and downstream of needle valve 27. As will be described in further detail below, flow rate signal 39 is preferably used as a feedback signal in one of several ways to be described in a feedback control loop configured to control the rate of flow of fluid dispensed from outlet 30 in accordance with a driving signal representing a desired flow rate. In robotic applications such a driving signal may conveniently be derived from a toolspeed signal which varies with the relative speed between outlet 30 and the workpiece, W. Such a toolspeed signal is supplied by the robot controller can be used to accurately control the amount of liquid material per unit length contained in the bead, B deposited on the surface of the workpiece, W by dispenser 10 as well as to assist in maintaining uniform conformation of the liquid material deposited on workpiece, W and/or selectively varying said conformation in a manner to be described later.

Flow rate sensor 38 may comprise any suitable sensor capable of generating a flow rate signal 39 indicative of the rate of flow of the fluid dispensed from nozzle 29. The flow of a viscous newtonian fluid at low Reynolds numbers is substantially linearly proportional to the pressure drop across a nozzle or tubular restriction placed in the flow path. Accordingly, sensor 38 may comprise a strain gauge pressure transducer operably disposed to sense the instantaneous fluid pressure at a location inside passage 26 immediately downstream of needle valve 27 to sense the pressure drop across nozzle 29. One pressure transducer suitable for this purpose is model A205 manufactured by Sensotec of Columbus, Ohio.

Servo-actuator 18 may incorporate any of a number of suitable types of fast-responding, electrically-actuated servovalves including jetpipe, nozzle-and-flapper, or spool types. In the preferred embodiment illustrated in FIG. 1, actuator 18 comprises jet-pipe electropneumatic servovalve 21 which operates double-acting air cylinder 22. Servovalve 21 includes a housing 42 which supports a threaded, electrical connector 43 secured thereto by screws 44. Wired to connector 43 by way of leads 45 are a pair of series-connected coils 46 which surround opposing ends 49 of an armature 50 which is mounted to pivot about a pivot point 51. A hollow, inverted U-shaped jet pipe 52 has one leg connected to a regulated air supply (not shown) of about 100 PSI nominal pressure through a threaded inlet 53 in air cylinder 19 by way of a removable screen or filter 54 for trapping particulates. The opposite leg of jet-pipe 52 is secured near its center to armature 50 so that when armature 50 is pivoted clockwise by energizing coils 46 at one polarity, the flow from jet pipe 52 is diverted toward a first port 60 which communicates with the space above piston 22. Similarly, when coils 46 are energized in the opposite polarity, armature 50 pivots counter-clockwise to direct the flow from jet pipe 52 toward a second port 61 which opens to the space beneath the piston 22 of air cylinder 19. In either polarity, the degree of the deflection of jet pipe 52 and hence, the pressure in ports 60 and 61 is proportional to the magnitude of the control current flowing in coils 46. Armature 50 is spring centered and magnetically biased such that when coils 46 are in a de-energized state, jet pipe 52 is in a neutral position, centered relative ports 60 and 61 as shown so that the pressures in ports 60 and 61 tend to be equally balanced. Magnetic bias is provided by a pair of permanent magnets 63 polarized as shown. Each magnet 63 which communicates with the armature field by way of a flux across air gaps 65. This flux is conducted to gaps 65 by way of four magnetically permeable members 66 arranged as shown.

Air cylinder 19 is a double-acting type and includes an aluminum alloy cylinder body 70, having a lower flange 72 which is used to secure the body 70 of air cylinder 19 to the upper portion 16 of frame 11 using cap screws 73. Cylinder body 70 includes first and second ports 60, 61, threaded air supply inlet 53, filter 54 as well as an axial cylinder bore 75. Piston 22 is received within bore 75 and connected to piston rod 20. Piston 22 is fitted with a pair of opposed cup seals 78. The space within bore 75 located above piston 22 communicates with first port 60 while the space beneath piston 22 is connected to second port 61. The direction and speed at which piston 25 drives needle valve 27 depends upon the differential pressure between ports 60 and 61 which appears across piston 22. As explained above, this pressure differential is determined by the deflection of jet pipe 52 due to the control current flowing in coils 46.

Piston 22 is retained within cylinder bore 75 at the lower end thereof by a cap 80 through which passes the lower portion 20a of piston rod 20. To prevent air leakage, cap 80 is provided with an internal cup seal 81 adjacent piston rod 20 and an external O-ring seal 82 between the outside surface of cap 80 and cylinder bore 75. Cup seal 81 is retained within cap 80 by a snap ring 83. Cap 80 is itself retained in the end of cylinder bore 75 by a snap-ring 84 which engages a groove cut in the lower portion of the wall of cylinder body 70.

Valve body 24 threads onto the lower end of a bonnet 97 and is sealed with respect thereto by means of an O-ring seal 98. Bonnet 97 includes an internal packing gland 99 which holds a plurality of annular PTFE packing seals 100. Seals 100 are retained in sealing but non-binding compression about valve stem 27a by means of an adjustable gland nut 101 threaded into the top of bonnet 97. To attach metering valve assembly 23 to frame 11, bonnet 97 is received by the extending lower portion 17 of frame 11 and secured thereto at a desired angular orientation by means of a locknut 102. This feature is useful where, for example, it is found that the fluid supply hose (not shown) which connects to fluid inlet 25 interferes with some structure in a given application. Locknut 102 can then be loosened and valve body 85 rotated to another angular position to avoid the interference, if possible.

Metering valve assembly 23 is connected to the piston rod 20 of actuator 18 by means of a coupling 105 having a threaded axial bore 106 into which the lower end 20a of piston rod 20 is threaded. The lower end of coupling 105 carries a threaded recess 107 which receives a bushing 108 which has an axial bore 109 into which the upper end of valve stem 27a is received and secured by means of a press fit. Coupling 105 is prevented from unthreading from piston rod 20 by an Allen head type locking screw 110 which is threaded into bore 106 into secure pressure engagement with the end face of piston rod 20 as shown.

To provide for fail-safe operation, gun 10 is provided with a compression spring 115 operable to close valve 27 in the event the control signal applied to servovalve 21 or the air supply to actuator 18 is interrupted to avoid an uncontrolled discharge of liquid from gun 10. Spring 115 is compressed between cap 80 and an annular shoulder 116 provided on coupling 105.

As an option which is not necessary for implementation of the present invention but, which is desirable for best control, dispensing gun 10 preferably includes a transducer assembly 119 for generating a position-dependent velocity signal 120. The detailed structure and operation of transducer assembly 119 are fully described in co-pending, commonly assigned U.S. patent application Ser. No. 07/164,536 incorporated herein by reference earlier. For present purposes, it is sufficient to note that one embodiment of transducer assembly 119 includes a coil 134 and a magnet 150 which are movable relative one another in a manner which tracks the relative motion between the stem 27a and seat 27b of metering valve 27. As shown in FIG. 1 magnet 150 is connected to piston rod 20 for axial movement with valve stem 27a while coil 134 remains in a fixed position relative valve seat 27b.

The operation of transducer 119 can be summarized as follows. The relative axial movement between coil 134 and magnet 150, which corresponds to the relative axial movement between valve seat 27a and conical stem 27b of valve stem 27, will induce a voltage across coil 134 in the form of a position-dependent velocity signal 120. Signal 120 has one polarity when valve 27 is moving closed (i.e. the distance between the stem 27a and seat 27b is decreasing.) and the opposite polarity when valve 27 is moving open (i.e. the distance between stem 27a and seat 27b is increasing). The magnitude of the position-dependent velocity signal 120 varies directly according to the relative velocity between stem 27a and seat 27b. For any given valve position, signal 120 increases as velocity increases and decreases as velocity decreases. The magnitude of the position-dependent velocity signal 120 also varies inversely according to the distance between stem 27a and seat 27b such that, at any given velocity, its magnitude decreases as said distance increases and, conversely, increases as said distance decreases. Position-dependent velocity signal 120 also has the characteristic that when the relative velocity between stem 27a and seat 27b is zero the magnitude of signal 120 is also zero irrespective of valve position. Valve 27 is more sensitive and the system is thus less stable when valve 27 is nearly closed than when it is more fully open. By relating the magnitude of the control signal applied to servovalve 21 to both the position and the velocity of valve 27, transducer 119 helps to ensure stability when valve 27 is more closed without unduly limiting response time when valve 27 operates more slowly and/or at more fully open positions. Thus, optional transducer 119 permits operation at significantly higher loop gain without risk of instability over the full range of valve 27.

Figure 2:
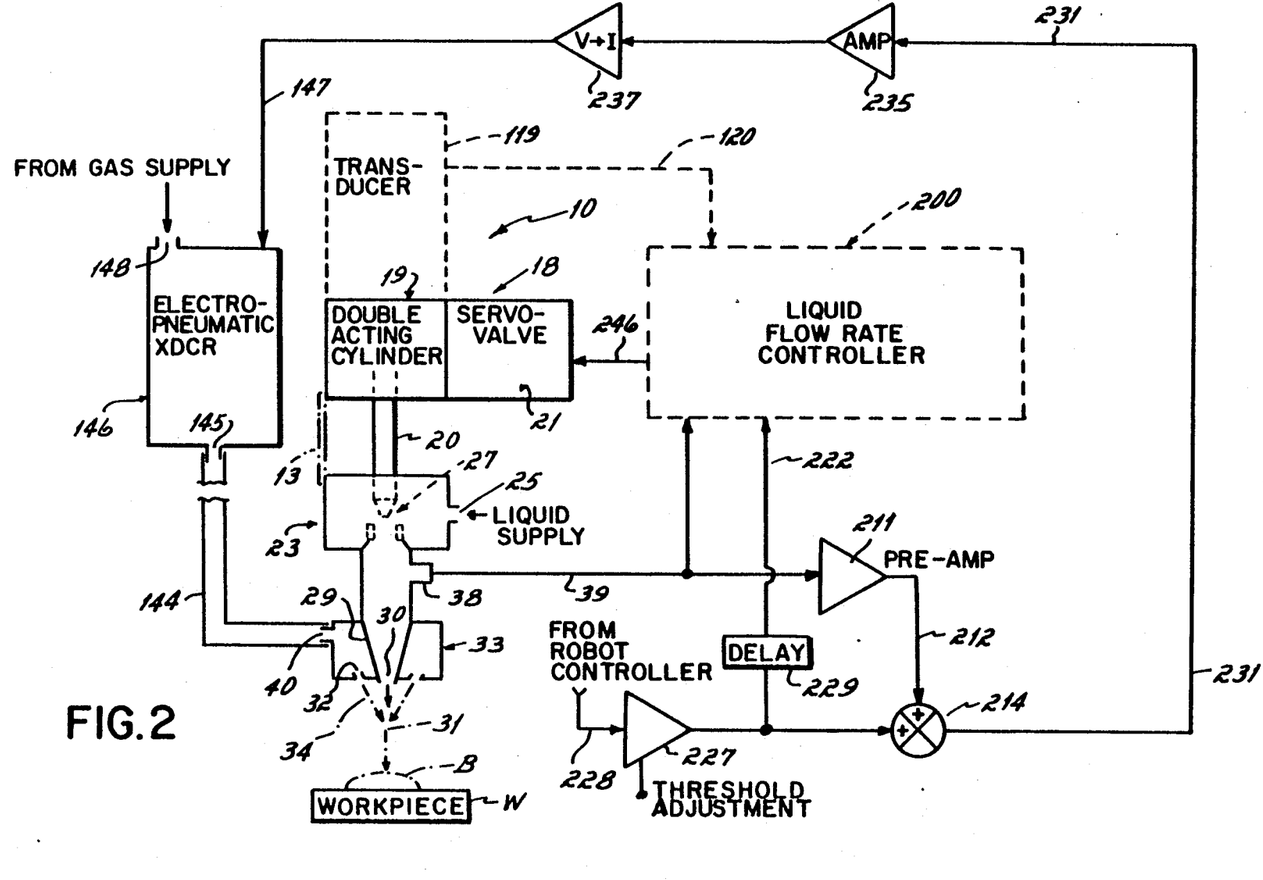
FIG. 2 is a schematic block diagram illustrating a preferred embodiment of a system for dispensing fluid materials according to the invention.

With reference now to FIG. 2, there is illustrated a preferred embodiment of the present invention. As depicted in FIG. 2, dispensing gun 10 is carried by the tool mounting face 13 of a robot manipulator having a robot controller (not shown) programmed to guide the outlet 30 of nozzle 29 in a predetermined path over the surface of workpiece, W to dispense a bead, B of liquid thereon in a desired pattern. The metering valve assembly 23 of gun 10 is connected at its fluid inlet 25 with a pressurized supply (not shown in FIG. 2) of the liquid to be dispensed. In order to provide bead, B with a desired conformation, the stream 31 of liquid material discharged from the outlet 30 of nozzle 29 is impacted by a series of downwardly angled gas jets 34 which converge on stream 31 at a common point located between outlet 30 and workpiece W. Each gas jet 34 emanates from one of the gas passageways 32 formed in gas cap 33. As schematically illustrated in FIG. 2, gas is supplied under pressure to gas cap 33 by way of a hose 144 connecting the gas inlet 40 with the gas outlet 145 of an electropneumatic transducer 146. The flow of gas from outlet 145 to passageways 32 is modulated by electropneumatic transducer 146 in continuous, closed loop fashion by a control signal 147.

Electropneumatic transducer 146 receives gas from a supply (not shown) by way of an inlet 148. Preferably, electropneumatic transducer 146 comprises a commercially available, current to pneumatic transducer with output booster such as a Catalog No. T 5226-4 available from Fairchild Industrial Products Co. of Winston-Salem, N.C. Where such a transducer is used, gas inlet 148 is suitably connected to a nominal 100 psi air supply. Alternatively, electropneumatic transducer 146 may suitably comprise a pump such as an electrically driven gas (e.g., air) pump whose output varies in a predictable manner according to an electrical input signal. In that event, the inlet of the pump could suitably be connected to atmosphere. Electropneumatic transducer 146 is preferably mounted in a fixed location remote from dispensing gun 10 in order to minimize the weight and bulk of the load carried by the robot. At the same time, hose 144 should be kept as short as possible in order to reduce pneumatic lag. Where the flow capacity of electropneumatic transducer 146 is insufficient to impart a desired conformation to the deposit of liquid material formed on the workpiece, an air-piloted regulator (not shown) may be connected in series with hose 144 as a volume booster. For example, a model 11-042-005 compressed air service, pilot-operated regulator manufactured by C. A. Norgren Co. of Littleton, Colo. may be used to boost the output of the Fairchild transducer mentioned above from a maximum of less than about 20 SCFm to a maximum of about 40 SCFm.

In order to control the volume of liquid material per unit length contained in bead, B, metering valve 27 is controlled in closed loop servo fashion according to a flow control signal 246 generated by a liquid flow rate controller 200. The structure and operation of controller 200 are described in detail in previously referenced U.S. patent application Ser. No. 07/164,536. For present purposes, it is sufficient to note that controller 200 causes metering valve 27 to be modulated as required between its fully open and fully closed positions in order to produce a desired rate of liquid discharge from outlet 30. Controller 200 receives a driving signal 222 which represents a desired liquid discharge rate and which is generated by an amplifier 227 in accordance with a toolspeed signal 228.

Toolspeed signal 228 is a signal available from the robot controller which varies according to the speed of travel of outlet 30 relative to workpiece, W. Through the robot controller, the gain of signal 228 can be adjusted by way of a toolspeed multiplier selected to provide a desired flow rate as a function of speed of travel. Standard robot controllers often have available a toolspeed signal 228 which leads the motion of tool mounting face 13 by some amount of time, usually a few tenths of a second. Where such a leading toolspeed signal is available, a time delay 229 is interposed between amplifier 227 and controller 200. Delay 229 is adjusted to equal any excess in time between the amount by which toolspeed signal 228 leads the motion of gun 10 and the actual lag in response between a step change in driving signal 222 and a corresponding change in flow emanating from outlet 30. Delay 229 thus serves to reduce the effect of any differences in the response times of the liquid and pneumatic portions of the system.

Flow rate sensor 38 continuously senses the pressure drop across nozzle 29 to generate a flow rate signal 39 correlated to the actual rate of flow of fluid discharged from the outlet 30 of nozzle 29. Signal 39 is received by liquid flow rate controller 200 to serve as a flow rate feedback signal utilized by controller 200 to produce flow control signal 246 which, as previously noted, is delivered to servovalve 21 for controlling liquid flow rate from outlet 30. Signal 39 also conveniently serves as means for monitoring the pressure of the fluid upstream of nozzle 29 for modulating the flow rate of the gas jets issuing from passageways 32 to control the conformation of the liquid material deposited on the workpiece, W in accordance with changes in the actual liquid flow rate. For the latter purpose, signal 39 is received and amplified by a pre-amp 211 to generate an amplified flow rate signal 212 which is received at a summing junction 214. Summing junction 214 also receives the undelayed output of amplifier 227. Normally, the response time of the pneumatic portion of the system will be slow enough that no additional time delay is required between amplifier 227 and summing junction 214. However, where toolspeed signal 228 leads the motion of gun 10 by an amount of time that is significantly greater than the response lag of the pneumatic portion of the system, an additional time delay (not shown) equal to such time difference should be inserted between the output of amplifier 227 and summing junction 214.

Amplifier 227 is preferably an operational amplifier whose gain is properly selected to scale toolspeed signal 228 so that driving signal 222 as well as the input to summing junction 214 will lie within a range compatible with the rest of the circuit. Amplifier 227 is preferably connected as a precision limiter such that for inputs between 0 volts and an adjustable threshold voltage, the voltage of driving signal 222 executes a decisive step in a polarity direction proper to close needle valve 27. Typically, the threshold voltage would be adjusted so that when the toolspeed signal 228 is about 50 mV or less, needle valve 27 is driven positively closed. This prevents needle valve 27 from leaking by providing a negative bias current to servovalve 18 effective to drive valve 27 positively closed at times when toolspeed signal 228 is either not present or is quite small.

Summing junction 214 produces a signal 231 whose magnitude and polarity correspond to the algebraic sum of signal 212 and the output signal from amplifier 227. Where required, signal 231 is input to a scaling amplifier 235. The output of scaling amp 235 is then input to a voltage to current converter 237 which produces a 4 to 20 milliamp control signal 147 operable to modulate the volume of air delivered by transducer 146 to passageways 32.

In operation, the system of FIG. 2 functions as a closed loop control system to modulate both the flow rate of liquid discharged from outlet 30 as well as the flow of gas issuing from passages 32. Both the liquid and pneumatic portions of the system are responsive to the pressure drop across nozzle 29 as sensed by flow rate sensor 38. Where optional transducer 119 is used, the liquid portion of the system is also controlled in accordance with the position and velocity of stem 27a relative to seat 27b as indicated by position-dependent velocity signal 120. With needle valve 27 initially closed, no liquid flow occurs and the pressure drop across nozzle 29 is zero. Assuming toolspeed signal 228 is less than the threshold voltage associated with amplifier 227, amplifier 227 generates a driving signal 222 of the proper polarity and of sufficient magnitude to cause controller 200 to generate a control current 246 effective to deflect jet pipe 52 toward first port 60. This holds piston 22 down so that needle valve 27 is held closed under force thereby preventing liquid leakage. Considering the pneumatic portions of the system when valve 27 is closed, it can be appreciated that both input signals to summer 214 are small so that signal 231 is likewise small as is control signal 147. Accordingly, electropneumatic transducer 146 allows little or no air to flow from gas outlet 145 so that little or no air issues from passages 32.

The foregoing conditions are maintained until toolspeed signal 228 rises above the threshold voltage of amplifier 227 indicating that liquid flow should commence. When this occurs, driving signal 222 reverses polarity. Since there is initially no flow, amplified flow rate signal 212 is at its zero value. Since there is initially no relative movement between stem 27a and seat 27b, position-dependent velocity signal 120 is also zero. Controller 200 causes a control signal 246 to be applied to coils 46 in such a polarity as to cause jet pipe 52 to deflect toward second port 61. In response, piston 22 begins to move upward causing needle valve 27 to open by lifting the valve stem 27a away from valve seat 27b. When this movement occurs, position-dependent velocity signal 120 assumes a non-zero value of a polarity tending to resist movement of stem 27a. As the pressure signal 39 generated by sensor 38 increases in response to the opening of valve 27, controller 200 causes control current 246 to decrease. Jet pipe 52 moves toward its null position and the magnitude of position-dependent velocity signal 120 declines toward zero. As the pressure drop across nozzle 29 approaches a steady state value corresponding to a desired flow rate represented by driving signal 222, jet pipe 52 causes valve 27 to remain open by an amount just sufficient to maintain the pressure drop across nozzle 29 at that value.

Figure 5:
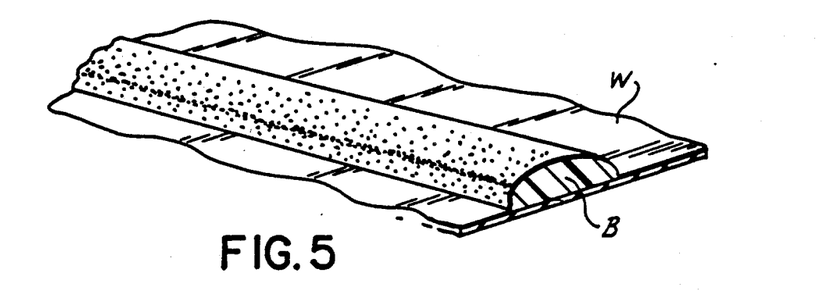
FIG. 5 is a schematic perspective view of a bead, B of fluid material having a first conformation.
Figure 6A:
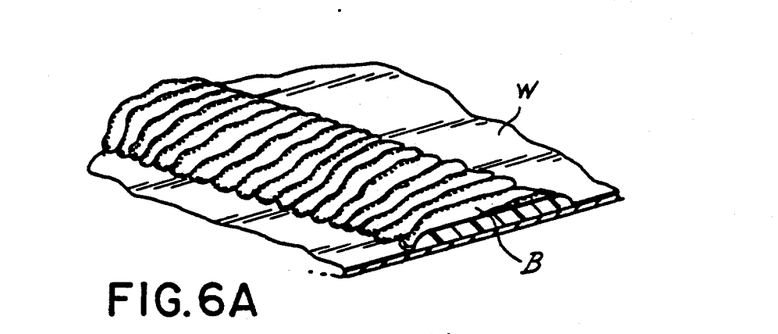
FIG. 6A is a schematic perspective view of a bead B of fluid material having a second conformation.
Figure 6B:
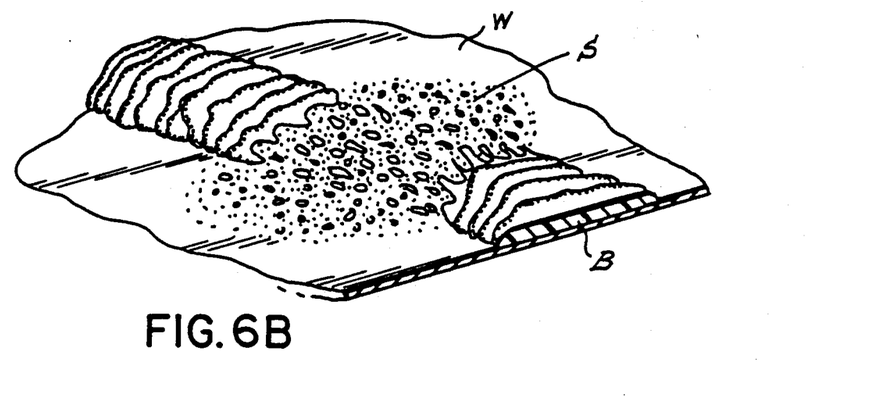
FIG. 6B is a schematic perspective view of a bead, B of fluid material having a second conformation and including a spattered area, S.

Considering the response of the pneumatic portion of the system as toolspeed signal 228 rises above the threshold of amplifier 227, the output of amplifier 227 reverses polarity. As flow of liquid commences, signal 212 rises with signal 39 and is added to the output of amplifier 227 by summer 214 causing signal 231 to increase resulting in corresponding increases in the output of amp 235 and the control signal 147 generated by voltage to current converter 237. Electropneumatic transducer 146 responds by allowing a flow of gas to pass from outlet 145 through hose 144 and ultimately to issue as a series of gas jets 34 from passageways 32. In the illustrated embodiment, those gas jets 34 are angled radially inwardly and downwardly as illustrated in FIG. 2 as to focus on the stream 31 of liquid discharged from outlet 30 at a common point. The impingement of gas jets 34 on stream 31 causes the bead B of liquid material deposited on workpiece W to assume a desired conformation which, by way of example may be characterized by a flattened, widened profile (as compared to the bead that would be formed without gas flow) and having a markedly rippled surface as illustrated in FIG. 6A. Alternatively, gas jets 34 can be oriented substantially parallel to stream 31 to impinge on the bead, B of material deposited on workpiece, W to control its conformation. The total flow of gas issuing from passageways 32 thus increases as the flow of liquid stream 31 increases and decreases as that flow increases. By so continuously modulating the gas flow rate in accordance with the liquid flow rate, a substantially uniform conformation of bead B is maintained despite changes in the liquid flow rate due to changes in either or both of the toolspeed signal 228 or the driving signal 222. At the same time, where such is not desired, the invention avoids spattering of bead B as illustrated in FIG. 6B; a condition has been found to occur when the flow of gas issuing from passageways 32 is excessive relative the liquid flow rate. Alternatively, where a bead having a more rounded profile and smoother surface is desired as illustrated in FIG. 5, gas jets 34 may be selectively cut off. In some cases, a spattered pattern of liquid droplets as shown at area S in FIG. 6B may even be desired. Such a conformation can be formed by providing a gas flow rate sufficient to disassociate the liquid stream discharged from the outlet 30 of nozzle 29.

Figure 3:
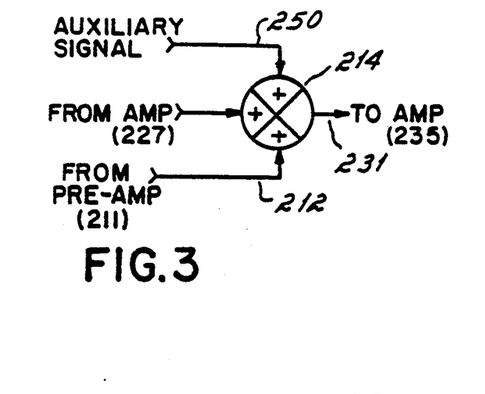
FIG. 3 is a schematic diagram showing a modification to the system of FIG. 2 illustrating a first alternative embodiment of the invention.
Figure 4:
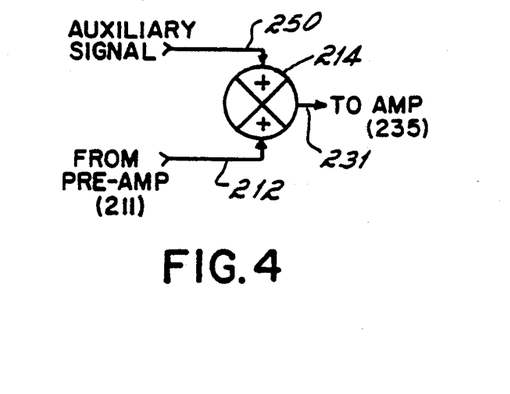
FIG. 4 is a diagram showing a modification to the system of FIG. 2 illustrating a second alternative embodiment of the invention.

FIGS. 3 and 4 illustrate first and second alternative embodiments of the invention, respectively, which may be implemented as shown by modifying the signals presented to summer 214. Referring initially to FIG. 3, a further aspect of the present invention contemplates the addition of an auxiliary signal 250 at summer 214 to enable different bead conformations to be selectively deposited on different workpieces or on different areas of a given workpiece. The robot controller is programmed to provide auxiliary signal 250 such that where the bead conformation of FIG. 6A is desired, auxiliary signal 250 has a substantially zero magnitude so that the system operates as described above with reference to FIG. 2. However, where the bead conformation of FIG. 5 is desired, the robot controller provides an auxiliary signal 250 having a polarity and magnitude sufficient to at least cancel the sum of the other signals received at summer 214 so that control signal 147 will cause electropneumatic transducer 146 to selectively cut off the gas jets issuing from passageways 32. When this occurs, bead B will assume the conformation of FIG. 5 rather than that of FIG. 6A. Thus different bead conformations can readily be provided on different workpieces and/or on selected portions of a given workpiece. In cases where a spattered or dispersed conformation is desired such as that shown in area S of FIG. 6B, auxiliary signal 250 is selected to have a polarity and magnitude additive those of the other signals received by summer 214 so that control signal 147 will cause transducer 146 to produce a gas flow at jets 34 large enough to disintegrate the stream 31 of liquid discharged from gun 10.

In some applications it may not be necessary or desirable to control deposit conformation with reference to the relative speed between the outlet 30 of gun 10 and workpiece W. Such may be the case for example where that relative speed is substantially constant, at least at times when fluid material is to be delivered from outlet 30. As illustrated in FIG. 4, in those instances summer 214 may be connected to auxiliary control signal 250 and the signal 212 emanating from preamp 211 without need of connection to amp 227. This permits selectively changing deposit conformation on different workpieces and/or on selected portions of a given workpiece but without compensation for changes in flow rate occasioned by changes in the relative speed between gun 10 and workpiece, W.

The liquid dispensing systems described above have been found to operate satisfactorily provided significant sudden drops in the liquid pressure supplied to gun 10 by way of inlet 25 do not occur. Where such abrupt changes in liquid pressure are encountered, the flow of gas from passageways 32 can become too large in relation to the liquid pressure in nozzle 29 to maintain adequate control over deposit conformation. When this occurs, as illustrated in FIG. 6B, the conformation of bead B can be disrupted resulting in a spattered area S of liquid material on the surface of workpiece, W. This phenomenon can be avoided by providing appropriate compensation of gas flow to accommodate such changes in liquid supply pressure. Two systems for carrying out such compensation according to third and fourth alternative embodiments of the present invention will now be described with reference to FIG. 7.

Figure 7:
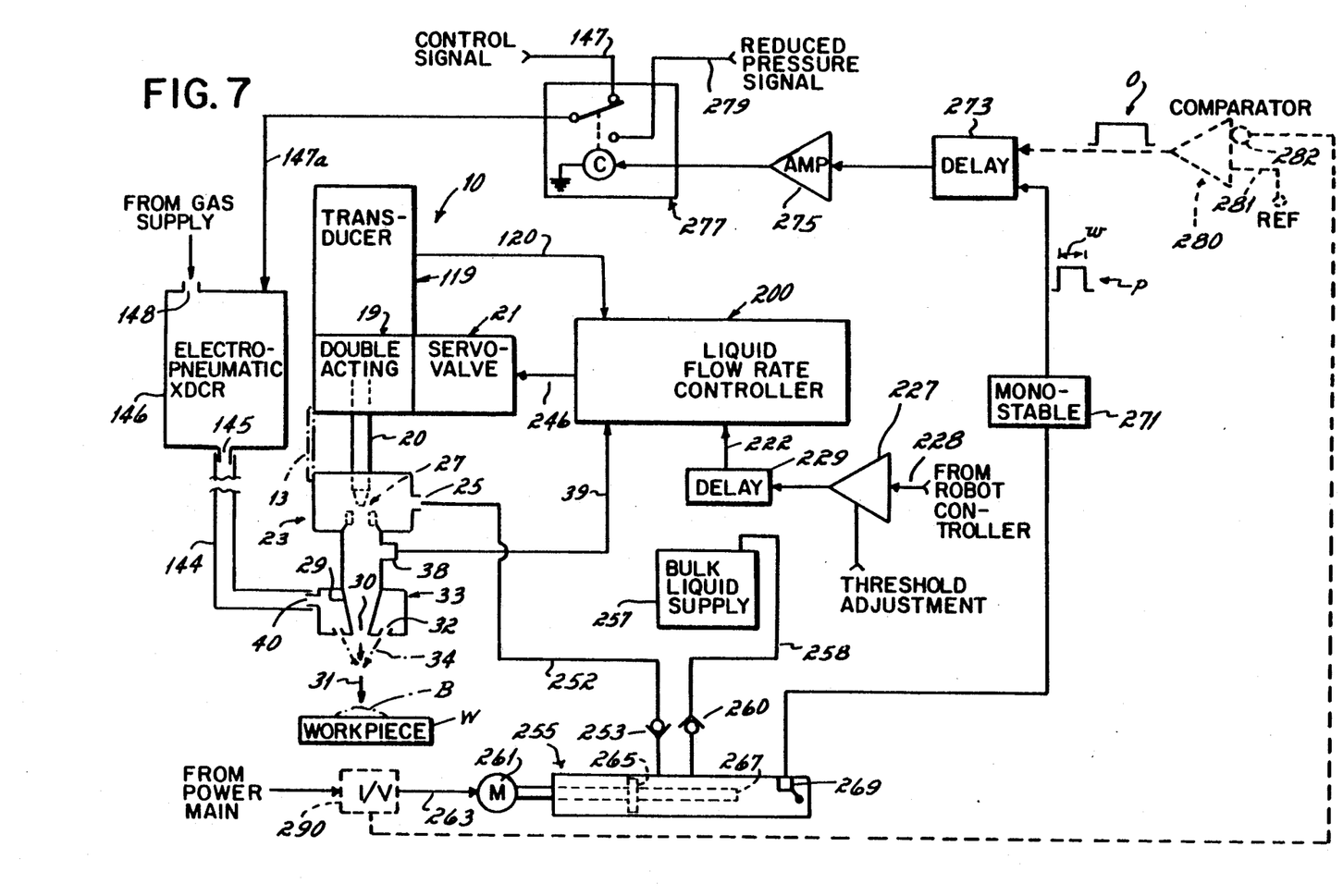
FIG. 7 is a schematic block diagram illustrating third and fourth alternative embodiments of the invention.

Referring now to FIG. 7, the flow rate of liquid discharged from outlet 30 of the liquid dispensing gun 10 carried on the tool mounting face 13 of a manipulating robot (not shown) is controlled by liquid flow rate controller 200 in the manner previously described with reference to FIG. 2. Controller 200 receives a pressure feedback signal 39 from flow rate sensor 38, a driving signal 222 developed from tool speed signal 228 as processed by amplifier 227 and delay 229 as well as an optional position and velocity dependent signal 120 developed by optional transducer 119. From these inputs, controller 200 generates a liquid flow rate control signal 246 applied to the servovalve 21 of gun 10 to control liquid flow rate in the manner described earlier. Gun 10 is also fitted with a gas cap 33 having a plurality of passageways 32 oriented to form gas jets 34 impinging on the stream 31 of liquid discharged from outlet 30. Gas is conducted to gas cap 33 from an electropneumatic transducer 146 by way of a hose 144 in the manner previously described. The flow rate of gas discharged from transducer 146 is modulated in accordance with a control signal 147a which is developed in a manner to be described below.

As FIG. 7 schematically illustrates, liquid material is supplied to the inlet 25 of gun 10 by way of a hose 252 and check valve 253 connected to the outlet of a reciprocating fluid pump 255. Pump 255 is itself supplied with liquid material from a bulk liquid supply 257 by way of a second hose 258 and check valve 260. Pump 255 is driven by an electric motor 261 having an electrical power input 263 connected to a suitable power main. Pump 255 includes a reciprocating plunger 265 which, according to a third embodiment of the invention is linked to a suitable limit switch operator 267 arranged to actuate a limit switch 269 when plunger 265 reaches the end of its liquid discharge stroke. When plunger 265 reaches the end of its discharge stroke, the pressure of liquid being supplied to gun 10 will undergo a significant momentary drop as piston 265 is retracted during an intake stroke to refill pump 255 with liquid from bulk supply 257. The length of time for that pressure drop to be transmitted to gun 10 will vary somewhat according to the characteristics of the fluid being dispensed as well as the length and compliance of hose 252.

According to a third embodiment of the invention, limit switch 269 is connected to a monostable 271 which, in turn, is connected to a time delay circuit 273. Time delay 273 is adjusted to delay the signal from mono-stable 271 by an amount of time sufficient in relation to the time lags associated with both the liquid and pneumatic portions of the system to ensure that the gas pressure as passageways 32 is periodically reduced by an amount necessary to avoid disruption of the conformation of the dispensed bead, B for a time interval commencing at the onset of the pressure drop at the liquid outlet 30 of gun 10 and continuing at such a reduced level until the local liquid pressure in the vicinity of outlet 30 rises to normal dispensing levels. As noted previously, the time lag of liquid portion of the system i.e., the amount of time for a drop in the fluid pressure at pump 255 (as sensed in this embodiment by limit switch 269) to manifest itself at the outlet 30 of gun 10 will vary somewhat in accordance with the length and compliance of hose 252 as well as the characteristics of the particular liquid being dispensed. Likewise, the time lag of the pneumatic portion of the system, i.e., the operating delay associated with electropneumatic transducer 146 plus the transmission delay associated with transmission of a change in pressure from the outlet 145 of transducer 144 to passageways 32 will vary with such factors as the length and compliance of hose 144. Time delay circuit 273 is in turn connected to a scaling amplifier 275 the output of which is connected to a solid state switch 277. For clarity, switch 277 is schematically illustrated in FIG. 7 as a electromechanical relay having an operating coil C. The output of switch 277 is applied to electropneumatic transducer 146 in the form of control signal 147a. As illustrated, control signal 147a normally is connected to control signal 147. Control signal 147 may conveniently be generated in the manner described previously with reference to FIG. 2 as well as according to the alternatives described with reference to FIGS. 3 and 4. For the sake of clarity, the circuitry for generating control signal 147 as illustrated in FIGS. 2, 3 and 4 is not duplicated in FIG. 7 nor is the description of the operation of that circuitry repeated here. When switch 277 is activated by amplifier 275, control signal 147a is changed from control signal 147 to a reduced pressure signal 279 operable to sufficiently reduce the flow of gas discharged by transducer 146 to avoid any undesired disruption of the conformation of bead, B. For this purpose, reduced pressure signal 279 may conveniently comprise a fixed voltage reference.

In operation, the plunger 265 of pump 255 will be driven forward by motor 261 to supply liquid under pressure to gun 10 by way of hose 252. Upon reaching the end of its liquid discharge stroke, plunger 265 is retracted by motor 261 to execute an intake stroke operable to refill pump 255 from bulk liquid supply 257. The momentary pressure drop associated with the intake stroke of pump 255 is thus indirectly sensed by limit switch 269. This pressure drop will become apparent at gun 10 only after sufficient time for the pressure drop to be transmitted from pump 255 to gun 10 by way of hose 252. To avoid any undesired disruption in the conformation of the bead, B of fluid material applied to workpiece, W such as the spattering illustrated in FIG. 6B, the invention compensates the flow of the gas jets 34 emanating from passageways 32 at the time when the pressure drop manifests itself at gun 10. According to this third alternative embodiment of the invention, limit switch 269 is actuated by operator 267 when plunger 265 reaches the end of its liquid discharge stroke thus indicating the onset of a liquid pressure drop. Limit switch 269 triggers mono-stable 271 which generates a pulse, P having a width, w corresponding to the expected length of the pressure drop. Following the time delay imposed by circuit 273, pulse P is transmitted to amplifier 275 which causes switch 277 to switch reduced pressure signal 279 onto control line 147a for a length of time corresponding to the width, w of pulse, P. After the pneumatic lag period described above, this results in a decrease in the gas pressure at passageways 32 at substantially the exact time when the pressure drop from pump 255 becomes apparent at outlet 32 thereby avoiding significant disruption of the conformity of the bead B of liquid deposited on workpiece W.

A fourth alternative embodiment of the invention is illustrated in phantom lines in FIG. 7. According to this embodiment, which is otherwise similar to the third embodiment just described, limit switch 269, its operator 267 as well as mono-stable 271 are eliminated. In place of them, delay 273 is fed by the output of a comparator 280 having a fixed reference input 281 and an inverting input 282 connected to a current to voltage converter 290 placed in series with the power input 263 of the motor 261 driving pump 255.

In operation, the fixed voltage reference input 281 to comparator 280 is selected such that comparator 280 generates a high level output signal, O so long as the voltage signal applied to input 282 indicates that the power drawn by motor 261 corresponds to the lower power level associated with the liquid intake stroke of pump 255. Signal 0 undergoes a transition to a low level once plunger 265 begins to be driven forward by motor 261 during the discharge stroke of pump 255 thus indicating the end of the low liquid pressure interval. Signal O is delayed by delay circuit 273 in the manner described above to effect a decrease in the pressure of gas flowing from passageways 32 at precisely the time each low liquid pressure interval induced by the pumping cycle of pump 255 becomes apparent at liquid outlet 30. In this way the invention permits maintaining substantial uniformity of the conformation of the bead B of fluid material applied to workpiece W notwithstanding significant variation of the pressure at which liquid is supplied to gun 10.

What is claimed is:

1. An apparatus for dispensing fluid material onto a workpiece, said apparatus comprising:
   (a) inlet means connectable to a source of the material for receiving material from said source;
   (b) nozzle means communicating with said inlet means and having an outlet for discharging a stream of the material toward the workpiece to form a deposit of the material thereon;
   (c) gas jet forming means for forming at least one gas jet impinging upon at least one of, said stream and said deposit to impart a desired conformation to said deposit;
   (d) sensing means for generating a first signal correlated to the flow rate of the fluid material, and
   (e) control means connected to said gas jet forming means, said control means utilizing at least said first signal for generating a control signal for modulating the flow of gas issuing from said gas jet forming means as to maintain substantial uniformity of said conformation of said deposit of material.

2. The apparatus of claim 1 wherein said control means further comprises:
   electropneumatic transducer means having a gas inlet communicating with a source of said gas and a gas outlet connected to said gas jet forming means, said electropneumatic transducer means being responsive to said control signal to control the flow of gas from said gas inlet to said gas jet forming means.

3. The apparatus of claim 2 wherein said electropneumatic transducer comprises at least one of; a current to pressure transducer and, a voltage to pressure transducer and wherein said source of said gas is a pressurized source.

4. The apparatus of claim 2 wherein said electropneumatic transducer comprises a variable pump and wherein said source of said gas is the atmosphere.

5. The apparatus of claim 1 wherein said control means includes means for decreasing said flow of gas issuing from said gas jet forming means when said parameter indicates a drop in said pressure of the fluid material in order to prevent said gas jet from spattering said fluid material on the workpiece.

6. The apparatus of claim 1 further comprising pump means connected to said inlet means for supplying fluid material under pressure thereto, said pump means defining a pump operating cycle including at least one interval associated with a drop in said fluid material pressure, said sensing means operating to determine said interval by sensing said pump operating cycle.

7. The apparatus of claim 6 wherein said sensing means senses the position of a movable member of said pump.

8. The apparatus of claim 6 wherein said pump is an electrical pump and said sensing means senses a parameter correlated with the electrical power driving said pump.

9. The apparatus of claim 1 wherein said control means further includes means for combining a toolspeed signal with said first signal to derive said control signal, said toolspeed signal being correlated to the relative speed between said workpiece and said outlet.

10. An apparatus for dispensing fluid materials onto a workpiece, said apparatus comprising:
    (a) inlet means connectable to a source of the material for receiving material from said source;
    (b) nozzle means communicating with said inlet means for discharging a stream of the material toward the workpiece to form a deposit of the material thereon;
    (c) gas jet forming means for forming at least one gas jet impinging upon at least one of, said stream and said deposit to impart a desired conformation to said deposit;
    (d) manipulator means for effecting relative movement between said nozzle and said workpiece along a predetermined path, and
    (e) control means connected to said gas jet forming means, said control means utilizing at least an auxiliary signal variable in accordance with the position of said nozzle along said path for generating a control signal for modulating the flow of gas issuing from said gas jet forming means so that said conformation of said deposit can be selectively varied over different portions of said path.

11. The apparatus of claim 10 further comprising, sensing means for generating a first signal correlated to the pressure of the fluid material at a location upstream of said outlet, said control means including means for combining said first signal and said auxiliary signal to derive said control signal.

12. The apparatus of claim 10 wherein said control means further comprises means for combining said first signal and said auxiliary signal with a toolspeed signal to derive said control signal, said toolspeed signal being correlated to the speed of relative movement between said workpiece and said outlet.

13. An apparatus for dispensing fluid material onto a workpiece, said apparatus comprising:
   (a) means for discharging a stream of the material under pressure from a nozzle having an outlet directed toward the workpiece;
   (b) means for effecting relative movement between the nozzle and the workpiece along a path to deposit said material in the form of a bead upon the workpiece;
   (c) means for directing a flow of gas toward at least one of, said stream and said bead to impart a desired conformation to said bead, and
   (d) means for reducing said flow of gas when said pressure drops, said reduction being sufficient to avoid spattering of the material on the workpiece.

14. The apparatus of claim 13 further comprising:
means for sensing the pressure of the fluid material at a location upstream of said outlet, and
means for initiating said reducing step upon sensing a reduction in said pressure.

15. The apparatus of claim 13 further comprising:
means for pumping the material to said nozzle according to a pumping cycle including at least one interval of reduced pumping pressure, and
means for initiating said reducing step in timed relation to said interval.

16. The apparatus of claim 15 further comprising:
means for monitoring said pumping cycle to determine the occurrence of said interval.

17. The apparatus of claim 16 wherein said monitoring means includes means for sensing the position of a movable member of the pump.

18. The apparatus of claim 16 wherein said pumping means includes a power driven pump and said monitoring means includes means for sensing changes in a parameter correlated to the power driving the pump.

19. The apparatus of claim 13 wherein said means for directing said flow of gas includes means for forming a plurality of gas jets focused on said stream at a location intermediate said outlet and said workpiece.

20. The apparatus of claim 19 wherein said jets emanate from a plurality of locations substantially equally radially spaced outward relative said outlet and said jets are oriented along a velocity vector having both a first component directed substantially radially inwardly toward said outlet and a second component directed substantially parallel to said stream.

21. An apparatus for dispensing fluid material onto a workpiece, said apparatus comprising:
   (a) means for discharging a stream of the material under pressure from a nozzle having an outlet directed toward the workpiece;
   (b) means for effecting relative movement between the nozzle and the workpiece to form a deposit of said material in a pattern on the workpiece;
   (c) means for directing a flow of gas toward at least one of, said stream and said deposit to impart a desired conformation to said deposit, and
   (d) means for modulating said flow of gas in accordance with said pressure to maintain substantial uniformity of said conformation of said deposit over at least a portion of said pattern.

22. The apparatus of claim 21 wherein said modulating means includes means for decreasing said flow in response to decreases in said pressure.

23. The apparatus of claim 21 wherein said modulating means includes means for increasing said flow in response to increases in said pressure.

24. The apparatus of claim 21 wherein said modulating means includes means for both decreasing said flow in response to decreases in said pressure and increasing said flow in response to increases in said pressure.

25. An apparatus for dispensing fluid material onto a workpiece, said apparatus comprising:
   (a) means for discharging a stream of the material under pressure from a nozzle;
   (b) means for effecting relative movement between the nozzle and the workpiece along a path to form a deposit of said material in a pattern on the workpiece;
   (c) gas flow directing means for directing a flow of gas toward at least one of, said stream and said deposit to impart a desired conformation to said deposit, and
   (d) means connected to said gas flow directing means for modulating said flow of gas in accordance with an auxiliary signal selectively variable as a function of the position of said nozzle along said path in order to selectively vary said conformation of said deposit over said different portions of said pattern.

26. An apparatus for dispensing fluid material onto a workpiece, said apparatus comprising:
   (a) means for discharging a stream of the material under pressure from a nozzle;
   (b) means for effecting relative movement between the nozzle and the workpiece along a path to form a deposit of said material in a pattern on the workpiece;
   (c) means for directing a flow of gas toward at least one of, said stream and said deposit to impart a desired conformation to said deposit, and
   (d) means for modulating said flow of gas in accordance with both said pressure of said fluid material and the relative speed between said workpiece and said nozzle to maintain substantial uniformity of said conformation of said deposit over at least a portion of said pattern.

* * * * *